3,265,691
1-BENZYL-2-AMINOMETHYL-5,6-DIALKOXY-
BENZIMIDAZOLES
Helmer Richter, Grafing, near Munich, and Dieter Rahtz,
Berlin, Germany, assignors to Schering AG, Berlin,
Germany
No Drawing. Filed Feb. 5, 1964, Ser. No. 342,820
Claims priority, application Germany, Feb. 9, 1963,
Sch 32,737
27 Claims. (Cl. 260—247.5)

The present invention relates to benzimidazoles with blood vessel dilating action, and more particularly to new 1 - benzyl - 5,6 - dialkoxybenzimidazole derivatives which have highly effective coronary blood vessel dilating action.

Therapeutically useful compounds in a series of benzimidazole compounds have been known, for example the anti-allergic compound 1-p-chlorobenzyl-2-pyrrolidylmethylbenzimidazole and the antiphlogistic active 1-ethyl-2-diethanolaminomethyl - 5 - chlorobenzimidazole-monochlorohydrate. However, none of the known series of benzimidazoles have been described as having any coronary dilating action.

Several of the known 1-benzimidazoles have been found by us to have in addition to other properties also coronary blood vessel dilating properties. However, these compounds are not therapeutically useful for this purpose, because they exhibit only a weak action for a short period of time, or, where there is a stronger short time activity there is a general blood vessel dilating action which with it brings a considerable lowering of the blood pressure. This results in such unfavorable influence on the circulation that a substance of this type cannot be used as a coronary dilator.

It is accordingly a primary object of the present invention to provide new and useful coronary blood vessel dilating compounds of the benzimidazole series.

It is another object of the present invention to provide coronary blood vessel dilating compounds which act for a relatively long time with a relatively high degree of activity.

It is yet another object of the present invention to provide compounds which are highly effective coronary blood vessel dilators and which do not unfavorably cause a lowering of blood pressure or unfavorably influence the circulatory system.

It is yet another object of the present invention to provide a method of producing the compounds of this invention.

It is a further object of the present invention to provide the use of the compounds of the invention for the purpose of causing coronary blood vessel dilation.

Other objects and advantages of the present invention will be apparent from a further reading of the specification and of the appended claims.

With the above and other objects in view, the present invention mainly comprises a compound selected from the group consisting of compounds of the formula:

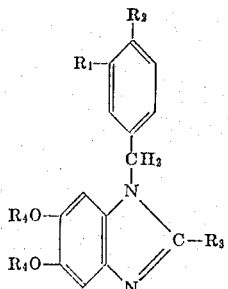

wherein $R_1$ is selected from the group consisting of hydrogen and lower alkoxy, wherein $R_2$ is selected from the group consisting of hydrogen, halogen and alkoxy, wherein $R_3$ is selected from the group consisting of hydrogen, alkyl, haloalkyl, hydroxyalkyl, and aminoalkyl wherein the amino is the radical:

wherein $R_5$ and $R_6$ are each separately selected from the group consisting of hydrogen, alkyl, "alkyl" signifies saturated and unsaturated alkyl radicals, substituted and unsubstituted pyrimidyl, and hydroxyalkyl, and together with the nitrogen atom 5-member and 6-member heterocyclic radicals, and wherein $R_4$ is a lower alkyl; and salts thereof with physiologically compatible acids. These acids may be inorganic or organic.

The above compounds possess coronary blood vessel dilating action without any of the above mentioned disadvantages of the known compounds.

The heterocyclic radicals may be saturated or unsaturated. They may contain only the single nitrogen atom and the rest carbon atoms or they may contain in addition to the nitrogen atom shown in the general formula a further nitrogen atom plus carbon atoms, or they may contain an additional hetero atom besides the nitrogen and carbon, for example an oxygen or sulfur atom. Furthermore, the heterocyclic radical may be substituted or unsubstituted, for example it may be substituted by an alkyl radical.

The salts of the compounds of the above general formula would be any of the commonly known non-toxic acid addition salts, and may be with any physiologically compatible inorganic or organic acid such as hydrochloric acid, hydrobromic acid, sulfuric acid, phosphoric acid, titaric acid, citric acid, etc.

From the above group of compounds falling within the general formula, which compounds constitute new and extremely valuable coronary blood vessel dilating agents, the 2-substituted 1-(3',4'-diethoxybenzyl)-5,6-diethoxybenzimidazoles are particularly advantageous coronary blood vessel dilating agents because of their remarkably protracted activity.

The coronary blood vessel substances serve to improve the metabolism conditions in the heart muscle. A measurement of the useful effect of such substances is the increase of the oxygen saturation of the blood in the small coronary vessels (sinus coronarius). Coronary vessel dilation alone with only slight or with no increase of the oxygen saturation does not result in any improvement in the oxygen supply and the metabolism conditions of the heart.

The coronary action is determined in the circulation test on dogs in Pernocton (sodium butallylonal, also called β-bromallyl-butyl-barbituric acid) narcosis on the closed thorax. The preparation is administered intravenously in the vena saphena. The increase of the oxygen saturation of the coronary vessel blood as compared to the oxygen saturation in the blood of the arteria femoralis is measured. The blood pressure is simultaneously registered.

The testing arrangement used for measuring the oxygen saturation is the article by H. J. Bretschneider and his coworkers in "Verhandlungen Dtsch. Ges. für Kreislaufforschung," 22nd session (1956), pages 300–305. The oxygen saturation of the hemoglobin in the coronary vessels was measured photometically with the aid of a photocell bulb ("Oxymetrie" of Kurt Kramer, published by Thieme in Stuttgart in 1960).

In order to make certain that the coronary action of the new benzimidazoles of the present invention does not carry with it metabolism inhibiting properties, the arteriovenous lactic acid difference of the hearts of dogs after administration of the long duration active 1-(3',4'-diethoxybenzyl) - 2 - diethylaminomethyl-5,6-diethoxybenzimidazole-hydrochloride was determined. It was found that the increase of the oxygen saturation in the heart muscle blood is actually a result of improved heart muscle blood circulation.

As set forth in the introductory portion thereof, we have found that several already known benzimidazoles exhibit coronary blood vessel dilating action. However, these compounds are not useful for therapeutic purposes.

Thus, in the case of 2-benzylbenzimidazole (Walther, Pulowski in J. pr. Chem. [2], 59, 253 (1899)), it has been proved that it is not until administration of 5 mg./kg. in dog tests that any action is obtained, and then only a short period coronary dilation action (increase of oxygen saturation 18%), which, however, simultaneously carries with it a strong reduction in the blood pressure (to 30 mm. Hg).

The compound 1-benzyl-2-dimethylaminomethylbenzimidazole (German Patent No. 890,644 of June 1, 1953), in dog tests results with administration of 1 mg./kg. in only a weak coronary action (increase of the oxygen saturation in the small coronary vessels of 9% for 1.5 minutes).

For further comparison, the commercial preparation sold under the trade name "Amplivix," namely the compound 2-ethyl - 3 - (3',5'-diiodo-4'-hydroxybenzoyl)-benzofurane (XXXI), and the commercial product sold under the trade name "Segontin," namely N-[3'-phenyl-propyl-(2')]-1,1-diphenylpropyl-(3)-amine (XXXII) were subjected to the above described testing methods.

Compound XXXI only slightly influences the blood pressure (slight lowering), however it is only very weakly active as a coronary dilator. Its useful effect for myocardinal blood circulation is only measurable for a short time (oxygen saturation in coronary blood vessels). It is only by the administration of 5 mg./kg. in dog tests that it exhibits an increase of the oxygen saturation of 8% for 2 minutes.

Compound XXXII, in comparison to compound XXXI, exhibits a better useful effect on the myocardium. However, its activity quickly fades away, and its activity is accompanied with a strong lowering of blood pressure, which, most disadvantageously remains for a longer time than does the increase of the oxygen saturation in the coronary blood vessels. Thus, in dog tests, it is found that with a dose of 1 mg./kg. an increase of the oxygen saturation of 15% for 4 minutes results, along with a blood pressure lowering of 44% for more than 12 minutes. Furthermore, because of the toxicity of 18 mg./kg. (mouse, i.v.) the therapeutic latitude is not very great.

The following table sets forth the actions of the new benzimidazoles of the present invention, as well as of Amplivix (XXXI) and Segontin (XXXII). The result set forth in the table shows that the compounds of the present invention are superior to the comparative substances tested.

| No. | $LD_{50}$, mg./kg. mouse i.v. | Dose/kg. | Blood pressure lowering | | Increase in oxygen saturation | |
|---|---|---|---|---|---|---|
| | | | Percent | Minutes | Percent | Minutes |
| I | 175 | 500γ | 12 | 1 | 10 | 7 |
| | | 1 mg | 13 | 5 | 13 | 19 |
| II | 152 | 1 mg | 16 | 1 | 8 | 30 |
| | | 2 mg | 23 | 13 | 22 | 27 |
| III | 190 | 1 mg | 15 | 1 | 11 | 14 |
| IV | 270 | 1 mg | 8 | 2 | 7 | 6 |
| | | 2 mg | 11 | 15 | 13 | 12 |
| V | 195 | 100γ | 3 | 5 | 3 | 3 |
| | | 500γ | 28 | 17 | 36 | 11 |
| VI | 230 | 500γ | 8 | 1 | 7 | 2.5 |
| | | 2 mg | 16 | 1 | 14 | 14 |
| VII | 121 | 500γ | 6 | 1 | 5 | 23 |
| | | 1 mg | 13 | 5 | 11 | 30 |
| VIII | 205 | 1 mg | 13 | 1.5 | 4 | 3 |
| | | 2 mg | 24 | 0.5 | 8 | 16 |
| IX | 300 | 1 mg | 11 | | 17 | 2.5 |
| | | 2 mg | 20 | <1 | 18 | 7 |
| X | Difficultly soluble | 1 mg | 6 | <0.5 | 10 | 3.5 |
| XI | 235 | 1 mg | 18 | 6 | 15 | 3 |
| XII | 213 | 1 mg | 21 | 3 | 11 | 3 |
| XIII | 197 | 1 mg | 17 | 3 | 11 | 3 |
| XIV | 240 | 1 mg | 19 | | 12 | 4 |
| | | 2 mg | 22 | 6 | 16.5 | 7.5 |
| XV | 290 | 2 mg | 18 | 6.5 | 7.5 | 3 |
| XVI | 120 | 1 mg | 16 | >11 | 5 | >15 |
| XVII | 98 | 1 mg | 4 | 0.5 | 6.5 | 14 |
| XVIII | 154 | 1 mg | 10 | >6 | 8 | 10 |
| XIX | i.p. 240 | 1 mg | 7 | 4 | 12 | 8 |
| | p.o. >2,000 | 1 mg | | | | |
| XX | i.p. 1,050 | 1 mg | 21 | 3 | 20 | 6 |
| | p.o. 1,250 | | | | | |
| XXI | 138 | 1 mg | 10 | 1 | 6 | 5 |
| XXII | 138 | 1 mg | 12 | 1 | 7 | 13 |
| XXIII | i.p. 950 | 1 mg | 9 | >3 | 17 | >13 |
| | p.o. 1,800 | | | | | |

TABLE

| No. | LD₅₀, mg./kg. mouse i.v. | Dose/kg. | Blood pressure lowering | | Increase in oxygen saturation | |
|---|---|---|---|---|---|---|
| | | | Percent | Minutes | Percent | Minutes |
| XXIV | i.p. >1,000 / p.o. >1,000 | 1 mg | 13 | >3 | 16 | 3 |
| XXV | i.p. >2,000 / p.o. >2,000 | 1 mg | 13 | 1 | 18 | 10 |
| XXVI | 140 | 1 mg | 15 | 2.5 | 20 | 9.5 |
| XXVII | i.p. 1,050 / p.o. 1,550 | 1 mg | 2 | 0.3 | 10 | 8 |
| XXVIII | 143 | 1 mg | 6 | 2 | 14 | 4.5 |
| XXIX | i.p. 575 / p.o. 620 | 1 mg | 9.5 | 13 | 13 | 19 |
| XXX | 113 | 1 mg | 4 | 4 | 6 | 5.5 |
| XXXI | | 1 mg / 2 mg / 5 mg | 8 / 6 / 10 | 0.5 / 1.5 / 1 | 1.5 / 4 / 8 | 1.5 / 2 / 2 |
| XXXII | 18 | 500γ / 1 mg | 20 / 44 | 5 / 12 | 10 / 15 | 2.5 / 4 |

The formulas of compounds XXXI and XXXII were already given above. The following are the formulas of the compounds I–XXX.

I. 1-(3',4'-diethoxybenzyl)-2-diethylaminomethyl-5,6-diethoxybenzimidazole-hydrochloride
II. 1-(3',4'-diethoxybenzyl)-2-diethylaminomethyl-5,6-diethoxybenzimidazole-nitrate
III. 1-(3',4'-diethoxybenzyl)-2-morpholinomethyl-5,6-diethoxybenzimidazole-hydrochloride
IV. 1-(3',4'-diethoxybenzyl)-2-diethanolaminomethyl-5,6-diethoxybenzimidazole-hydrochloride
V. 1-(3',4'-diethoxybenzyl)-2-piperidinomethyl-5,6-diethoxybenzimidazole-hydrochloride
VI. 1-(3',4'-diethoxybenzyl)-2-dimethylaminomethyl-5,6-diethoxybenzimidazole-hydrochloride
VII. 1-(3'4'-diethoxybenzyl)-2-dipropylaminomethyl-5,6-diethoxybenzimidazole-hydrochloride
VIII. 1-p-ethoxybenzyl-5,6-diethoxybenzimidazole-hydrochloride
IX. 1-p-chlorbenzyl-2-dimethylaminomethyl-5,6-diethoxybenzimidazole-hydrochloride
X. 1-p-chlorbenzyl-5,6-diethoxybenzimidazole-hydrochloride
XI. 1-p-chlorbenzyl-2-dimethylaminomethyl-5,6-dimethoxybenzimidazole-hydrochloride
XII. 1-p-ethoxybenzyl-2-diethylaminomethyl-5,6-diethoxybenzimidazole-hydrochloride
XIII. 1-benzyl-2-diethylaminomethyl-5,6-diethoxybenzimidazole-hydrochloride
XIV. 1-p-chlorbenzyl-2-diethylaminomethyl-5,6-diethoxybenzimidazole-hydrochloride
XV. 1-(3',4'-dimethoxybenzyl)-2-diethylaminomethyl-5,6-dimethoxybenzimidazole-hydrochloride
XVI. 1-(3',4'-diethoxybenzyl)-2-diisopropylaminomethyl-5,6-diethoxybenzimidazole-hydrochloride
XVII. 1-(3',4'-diethoxybenzyl)-2-ethyl-propylaminomethyl-5,6-diethoxybenzimidazole-hydrochloride
XVIII. 1-(3',4'-diethoxybenzyl)-2-ethyl-isopropylaminomethyl-5,6-diethoxybenzimidazole-hydrochloride
XIX. 1-(3',4'-diethoxybenzyl)-2-methyl-sec-butyl-aminomethyl-5,6-diethoxybenzimidazole-hydrochloride
XX. 1-(3',4'-diethoxybenzyl)-2-pyrrolidylmethyl-5,6-diethoxybenzimidazole-hydrochloride
XXI. 1-(3',4'-diethoxybenzyl)-2-methylpiperazinomethyl-5,6-diethoxybenzimidazole-hydrochloride
XXII. 1-(3',4'-diethoxybenzyl)-2-oxyethylpiperazinomethyl-5,6-diethoxybenzimidazole-hydrochloride
XXIII. 1-(3',4'-diethoxybenzyl)-2-ethyl-hydroxyethyl-aminomethyl-5,6-diethoxybenzimidazole-hydrochloride
XXIV. 1-(3',4'-diethoxybenzyl)-2-[5-methoxypyrimidyl-(2)]-aminomethyl-5,6-diethoxybenzimidazole-hydrochloride
XXV. 1-(3',4'-diethoxybenzyl)-2-methyl-[5-methoxy-ethoxypyrimidyl-(2)]-aminomethyl-5,6-diethoxybenzimidazole-hydrochloride
XXVI. 1-(3',4'-diethoxybenzyl)-2-allylaminomethyl-5,6-diethoxybenzimidazole-hydrochloride
XXVII. 1-(3',4'-diethoxybenzyl)-2-cyclohexylaminomethyl-5,6-diethoxybenzimidazole-hydrochloride
XXVIII. 1-(4'-cyclohexyloxybenzyl)-2-diethylaminomethyl-5,6-diethoxybenzimidazole-hydrochloride
XXIX. 1-(3',4'-diethoxybenzyl)-2-diethylaminomethyl-5,6-dipropoxybenzimidazole-hydrochloride
XXX. 1-(3',4'-diethoxybenzyl)-2-diethylaminomethyl-5,6-diisobutoxybenzimidazole-hydrochloride In addition to the superior coronary vessel dilating action of the compounds of the present invention, as shown above, several of the new compounds of the invention also exhibit an excellent anti-inflammatory (antiphlogistic) activity, such as 1-p-chlorobenzyl-5,6-diethoxybenzimidazole-hydrochloride (X) and 1-(3',4'-dimethoxybenzyl)-2-dimethylaminomethyl-5,6-dimethoxybenzimidazole-hydrochloride (XV). Compound XV exhibits in the kaolin-edema test on the rat foot an antiphlogistic action depending upon the dose, using doses of 2 x 60 mg. and 2 x 120 mg./kg. i.p., which is at maximum 67%. The maximum action of the commercial preparation butazolidine (3,5-dioxo-1,2-diphenyl-4-n-butylpyrazolidine) in the same test amounts to 69%. In addition, 1-benzyl-5,6-diethoxybenzimidazole, 1-benzyl-2-diethylaminomethyl-5,6-diethoxybenzimidazole, 1-(3',4'-diethoxybenzyl)-5,6-diethoxybenzimidazole and 1-(3',4'-diethoxybenzyl)-2-diethylaminomethyl-5,6-dipropoxybenzimidazole exhibit an equally great antiphlogistic action as butazolidine.

Numerous compounds of the present invention possess analgesic activity. Thus, for example, 1-benzyl-5,6-diethoxybenzimidazole, 1-(3',4'-diethoxybenzyl)-2-dipropylaminomethyl-5,6-diethoxybenzimidazole, 1-p-chlorobenzyl-2-diethylaminomethyl-5,6-diethoxybenzimidazole, 1-p-ethoxybenzyl-5,6-diethoxybenzimidazole and 1-(3',4'-diethoxybenzyl)-2-allylaminomethyl-5,6-diethoxy benzimidazole exhibit an analgesic action which is as great as codeine and greater than 4-dimethylamino-1-phenyl-2,3-dimethyl-pyrazolone-(5) (the commercial preparation pyramidone) and greater than that of acetylsalicylic acid.

Furthermore, the compounds of the present invention also possesses sedative properties. This sedative activity must be emphasized since the previously known coronary vessel dilators do not exhibit this property, but on the contrary generally exhibit a central nervous system stimulating action. However, a simulating action is undesired in the treatment of heart disease such as angina pectoris.

A further advantage of the compounds of the present invention that the same are very well resorbed by the body, which is apparent from a comparison of the intravenous and per oral toxicity. The less the difference between these two types of toxicity values, the better the resorbility of the substance in question. Thus, for example, the values for compounds V and VI are as follows:

|  | $LD_{50}$, i.v. mouse | $LD_{50}$, p.o. mouse |
|---|---|---|
| Compound V | 195 mg./kg. | 440 mg./kg. |
| Compound VI | 230 mg./kg. | 570 mg./kg. |

The new alkoxylated benzylbenzimidazoles of the present invention can be produced in accordance with the generally known methods for synthesizing benzimidazoles, such as set forth in the work of John B. Wright (The Chemistry of Benzimidazoles, Chemical Reviews, 48, 397–541 [1951]), and the work of Klaus Hoffmann (The Chemistry of Heterocyclic Compounds: "Imidazole and Its Derivatives," Part I, Interscience Publishers, Inc., New York, 1953, pages 247–317, The Benzimidazoles).

It has been found particularly advantageous to subject suitably substituted o-phenylenediamines to a ring closing reaction. As second reaction component it is suitable to use therewith, carboxylic acids or imino ethers, preferably in the form of their salts.

The reaction of o-phenylenediamine with carboxylic acids takes place, preferably under warming, in accordance with the following equation:

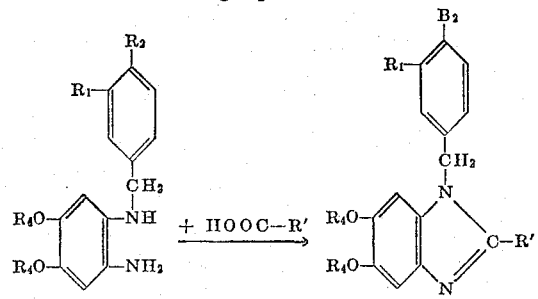

In the above equation R' means a hydrogen atom or an unsubstituted or substituted alkyl radical, for example a hydroxy alkyl radical.

Correspondingly, the reaction of o-phenylenediamines with imino-ether salts proceeds in accordance with the following equations:

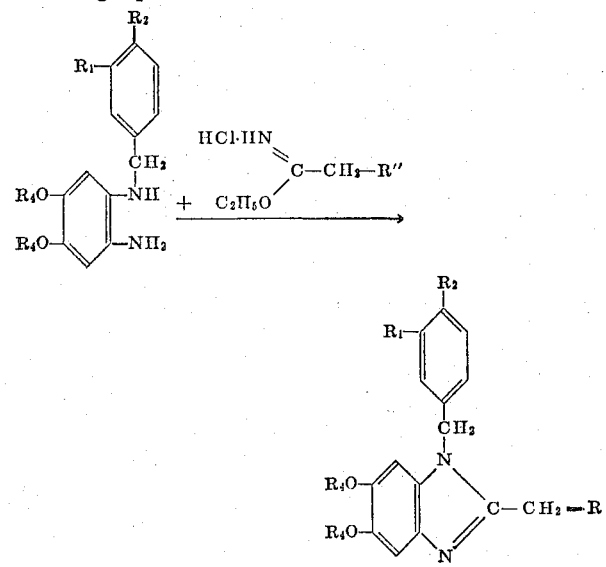

In the above formulas R'' is a hydrogen atom, chlorine or bromine atom, the hydroxyl group or an alkyl radical.

If it is desired that in the final compound the substituent $R_3$ be a N-substituted alkyl radical, the 2-hydroxyalkylbenzimidazoles and 2-haloalkylbenzimidazoles obtained in accordance with the described method are further reacted as shown in the following equations for the reaction of 2-hydroxymethylbenzimidazole:

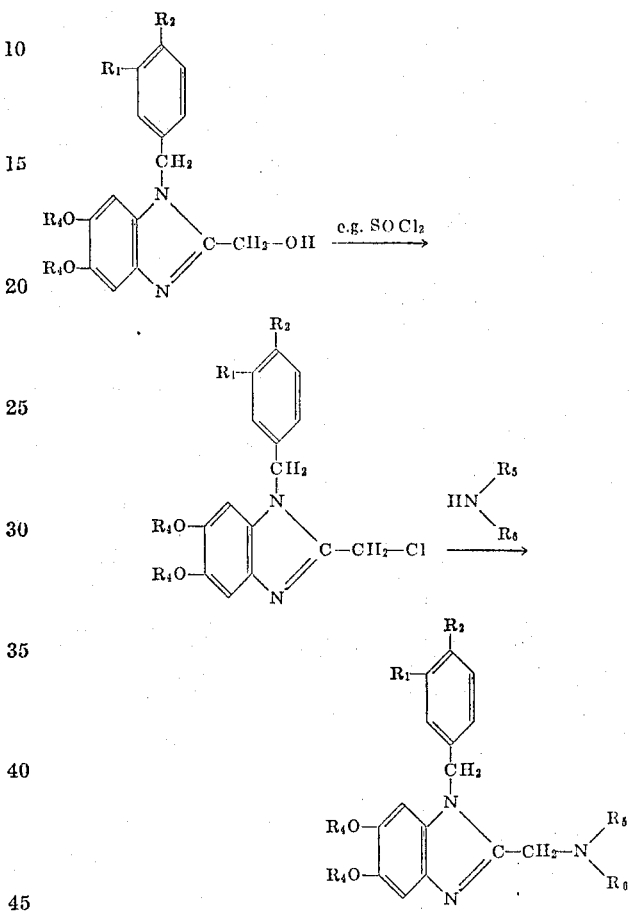

The necessary starting materials for the above synthesis can advantageously be obtained in the following manner:

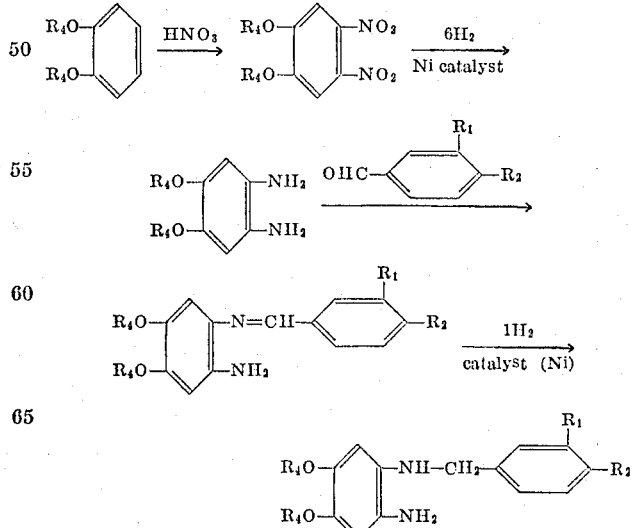

In Example 1 which follows there is set forth specific directions for the carrying out of this reaction. This reaction is not specifically claimed herein. The directions are analogously suitable for the production of other starting materials.

The following examples are given to further illustrate the present invention. The scope of the invention is not, however, meant to be limited to the specific details of the examples.

*Example 1.—1-(3,4'-diethoxybenzyl)-2-diethylamino-methyl-5,6-diethoxybenzimidazole*

Production of the starting material [N-(3',4'-diethoxybenzyl)-4,5 - diethoxy - o - phenylenediamine]: A 4 liter capacity round flask provided with a stirrer and a reflux condenser is charged with 795 cc. of nitric acid (d.=1.4). 132.5 g. of pyrocatechol-ethyl ether are slowly added thereto under stirring and cooling with ice water, while making certain that the temperature does not increase to above 10° C. The flask is then gradually warmed in an oil bath under additional stirring until an inner temperature of 100–105° C. is achieved (bath temperature 115–120° C.) and this temperature is maintained for 1 hour. The flask is removed from the oil bath, it is permitted to cool slowly under stirring and then further cooled with ice water. The crystallisate is filtered off under suction and washed with water until neutral. The thus obtained crude 4,5-dinitropyrocatechol-diethyl ether is dried in a vacuum dryer at 60° C. over potassium hydroxide and recrystallized from 1600 cc. of ethanol. The melting point is 109.5–110.5° C. The yield is 158 g.

The 4,5-dinitropyrocatechol-diethyl ether is hydrogenated in 10% methanolic solution with basically reacting Raney nickel (10%) as catalyst in an autoclave at 120 atmospheres pressure. The temperature increases thereby to approximately 50° C. After the completion of the taking up of hydrogen (several hours) the catalyst is filtered off under suction and the solution is evaporated in a vacuum evaporator at a maximum temperature of 40° C. and under a protective nitrogen atmosphere. The resulting precipitated crystalline 4,5-diethoxy-o-phenylenediamine melts at 103–109° C. and is further worked up as the crude product. The yield amounts to 97% of the theoretical.

1 cc. of piperidine and a solution of 38.9 g. of 3,4-diethoxybenzaldehyde are added to the solution of 39.3 g. of 4,5-diethoxy-o-phenylenediamine in methanol, under stirring and a protective nitrogen atmosphere. This results in the precipitation of the 3',4'-diethoxybenzal compound of 4,5-diethoxy-o-phenylenediamine (Schiff's base). The reaction mixture is cooled with ice water, filtered off under suction and washed with ice cold methanol. The yield is 96.6% of the theoretical. The melting point is 143–145° C.

The thus obtained Schiff's base is hydrogenated in an autoclave in 10% dioxane solution with basically reacting Raney nickel (10%) as catalyst at 120 atmospheres pressure and a temperature of 60° C. After the completion of the taking up of hydrogen (several hours) the catalyst is filtered off under suction and the solution is concentrated under vacuum and under protection of nitrogen at a maximum temperature of 40° C. The thus precipitated N-(3',4-diethoxybenzyl)-4,5-o-phenylenediamine is rubbed with petroleum ether and filtered off under suction. After drying in a vacuum dryer at 40° C., the resulting product melts at 81–84° C. The yield amounts to 90–95% of the theoretical.

By following the above directions other corresponding starting materials for use in the synthesis of the present invention can be easily produced.

The above compound is used for the production of 1-(3',4'-diethoxybenzyl)-2-diethylaminomethyl - 5,6 - diethoxybenziamidazole as follows:

76.6 g. of α-chloracetimino-ethylether-hydrochloride are suspended in 440 cc. of dry chloroform and reacted under stirring with a solution of 175 g. of N-(3',4'-diethoxybenzyl)-4,5-diethoxy-o-phenylenediamine in 550 cc. of dry chloroform. The working up is carried out under the exclusion of moisture. The reaction mixture is stirred for 30 minutes at room temperature and then for an additional 2 hours at 40° C. Water is then stirred into the sediment in order to dissolve the formed ammonium chloride. If the aqueous phase reacts acid, it is neutralized with aqueous sodium bicarbonate solution. The sediment is then rinsed into a separatory funnel. The chloroform solution is separated from the aqueous phase, washed with water and dried over sodium sulfate which has been subjected to a glowing treatment. The chloroform solution is then concentrated under vacuum under nitrogen protection at a maximum temperature of 40° C. The thus precipitated 1-(3',4'-diethoxybenzyl)-2-chloromethyl-5,6-diethoxybenzimidazole is rubbed with petroleum ether, subsequently filtered off under suction and dried under vacuum at 40° C. The yield amounts to 85.6% of the theoretical. The melting point is 118–121° C.

21.7 g. of 1-(3α,4'-diethoxybenzyl)-2-chloromethyl-5,6-diethoxybenzimidazole are dissolved in 110 cc. of benzene and gradually mixed under stirring and cooling with ice water, and under exclusion of moisture, with a solution of 8.8 g. of diethylamine in 20 cc. of benzene. The residue is permitted to stand overnight at room temperature and is subsequently heated for 2 hours under refluxing. After cooling, the precipitated diethylamino hydrochloride is filtered off under suction (4.7 g.=85.8% of the theoretical). The filtrate is then washed with water until neutral in a separatory funnel and extracted with dilute hydrochloric acid until a congo acid reaction. The hydrochloric acid solution is extracted again with ether and is then treated with decolorizing charcoal. It is then made alkaline with sodium carbonate solution and the precipitated base is taken up in ether. The ether solution is washed with water and dried over potassium carbonate. After evaporation of the ether there remains 1-(3',4'-diethoxybenzyl) - 2 - diethylaminomethyl - 5,6 · diethoxybenzimidazole as an oil, which after some time crystallizes. The base melts at 80–81° C. The yield amounts to 74.5% of the theoretical.

The 1 - (3',4' - diethoxybenzyl) - 2 - diethylaminomethyl-5,6-diethoxybenzimidazole is converted into the monhydrochloride with the calculated amount of hydrochloric acid. The hydrochloride is recrystallized from acetone-ether. It melts at 121–122° C. The yield amounts to 86.4% of the theoretical.

If the 1 - (3',4' - diethoxybenzyl) - 2 - diethylaminomethyl-5,6-diethoxybenzimidazole is mixed with the calculated amount of 0.2 n aqueous nitric acid solution and the solution is concentrated under vacuum, the nitrate is obtained. It is dissolved in a small amount of methanol and treated with decolorizing charcoal. The salt is crystallized by the addition of ether. It is dried under vacuum at 60° C. and melts at 100–101.5° C. The yield amounts to 81% of the theoretical.

*Example 2.—1-(3',4'-diethoxybenzyl)-2-diethylamino-methyl-5,6-diethoxybenzimidazole*

28 g. of α-hydroxyacetimino - ethylether-hydrochloride are suspended in 400 cc. of chloroform and mixed with a solution of 74.9 g. of N-(3',4'-diethoxybenzyl)-4,5-diethoxy-o-phenylenediamine (produced for example in accordance with Example 1) in 450 cc. of chloroform, under stirring. The working up is carried out under the exclusion of moisture. The reaction mixture is then stirred for 30 minutes at room temperature and thereafter for an additional 2 hours at 40° C.

Water is stirred into the sediment, whereby the formed ammonium chloride is dissolved. If the aqueous phase reacts acid, the sediment is neutralized with aqueous sodium bicarbonate solution. The chloroform solution is separated from the aqueous phase in a separatory funnel, washed with water and dried over sodium sulfate. The chloroform solution is then concentrated under vacuum at a maximum temperature of 40° C, and under nitrogen protection. The crude 1 - (3',4' - diethoxybenzyl) - 2-hydroxymethyl-5,6-diethoxybenzimidazole is dissolved in a small amount of methanol and the base is converted to the hydrochloride by the addition of ethereal hydrochloric acid. By a further addition of ether, it then precipitates as the salt. The melting point is 193–195° C. The yield is 57% of the theoretical. The free base which is obtained from the hydrochloride melts, after recrystallization from methanol and drying under vacuum (60° C.), at 153–154° C.

The 1 - (3',4' - diethoxybenzyl) - 2 - hydroxymethyl-5,6-diethoxybenzimidazole is converted to the 2-chloromethyl derivative by means of thionyl chloride. For this purpose, 16.9 g. of the base is mixed with 35 cc. of thionyl chloride under cooling with ice water and subsequently heated for 4 hours under refluxing. After distilling off the excess thionyl chloride under vacuum with nitrogen protection, the residue is dried over potassium hydroxide in a vacuum desiccator. The thus obtained 1-(3',4'-diethoxybenzyl) - 2 - chloromethyl - 5,6 - diethoxybenzimidazole-chlorohydrate can be recrystallized from ethanol. It melts at 190–192° C. The yield amounts to 72.5% of the theoretical. The base which is freed from the hydrochloride by means of sodium bicarbonate melts at 118–121° C.

In accordance with Example 1, the 1-(3',4'-diethoxybenzyl) - 2 - chloromethyl - 5,6 - diethoxybenzimidazole is converted by means diethylamine into 1-(3',4'-diethoxybenzyl) - 2 - diethylaminomethyl - 5,6 - diethoxybenzimidazole which melts at 80–81° C.

*Example 3.—1-(3',4'-diethoxybenzyle)-2-diethylaminomethyl-5,6-diethoxybenzimidazole*

A mixture of 37.4 g. of N-(3',4'-diethoxybenzyl-)-4,5-diethoxy-o-phenylenediamine (produced according to Example 1) and 9.13 g. of glycolic acid is heated slowly under vacuum to 100° C. This results in the splitting off of water. The temperature is then gradually increased to 135° C. and this temperature is maintained until the end of the foaming of the reaction mass. The heating time at 100° C. amounts to about 65 minutes. The residue is dissolved in chloroform, the solution is washed with water, treated with decolorizing charcoal and then brought to drynes. The residue is then dissolved in methanol, and the 1-(3',4'-diethoxybenzyl)-2-hydroxymethyl-5,6-diethoxybenzimidazole is then converted to the hydrochloride by the addition of ethereal hydrochloric acid until a congo acid reaction. The solution is treated with decolorizing charcoal, and the hydrochloride subsequently precipitated by the addition of ether. The salt is crystalized from methanol-ether and dried at 60° C. under vacuum. The hydrochloride melts at 192–194° C. The yield amounts to 52% of the theoretical.

The 1-(3',4'-diethoxybenzyl)-hydroxymethyl-5,6-diethoxybenzimidazole is converted according to Example 2, for example with thionyl chloride, into the 2-chloromethyl derivative, and this by further reaction with diethylamine is converted into the 1-(3',4'-diethoxybenzyl)-2-diethylaminomethyl-5,6-diethoxybenzimidazole which melts at 80–81° C.

*Example 4.—1-(3',4'-diethoxybenzyl)-2-dimethylaminomethyl-5,6-diethoxybenzimidazole*

31.8 g. of 1-(3',4'-diethoxybenzyl)-2-chloromethyl-5,6-diethoxybenzimidazole (produced according to Example 1 or Examples 2 and 3) are dissolved in 260 cc. of benzene, a pressure flask is filled therewith, and it is reacted under cooling by means of an ice-salt mixture with strongly cooled dimethylamine (35 cc.). The sediment is allowed to stand overnight at room temperature, a round bottom flask is filled with the reaction mixture and heated for an additional 3 hours under refluxing and exclusion of moisture. After cooling the reaction mixture is filtered off under suction, the filtrate is washed in a separatory funnel with water until neutral, and the 1 - (3',4' - diethoxybenzyl) - 2-dimethylaminomethyl-5,6-diethoxybenzimidazole is extracted with dilute hydrochloric acid until a congo acid reaction. The combined aqueous extract is washed with ether and treated with decolorizing charcoal. It is then made alkaline by means of sodium carbonate solution, the precipitated base is taken up in ether, the ethereal solution is washed with water and dried over potassium carbonate. After evaporation of the ether the base remains as an oil which quickly crystallizes.

The base is converted into the monohydrochloride with the calculated amount of aqueous hydrochloric acid. The monohydrochloride is recrystallized from acetone-ether or methanol-ether. The salt is dried at 60° C. in a vacuum chamber over potassium hydroxide. It melts at 170–171° C. The yield amounts to 55% of the theoretical.

If the hydrochloride does not precipitate in pure form (for example too low a melting point of 166° C.), it is dissolved in methylene chloride and this solution is filtered over 10 times the amount of aluminum oxide (Woelm) and again eluated with methylene chloride. There is thus obtained after evaporation of the methylene chloride the base which has a melting point of 96–97° C. The monohydrochloride which is obtained from this base is unobjectionable and melts at 170–171° C.

This purification method is also applicable to other substances produced according to the present invention.

*Example 5.—1-(3',4'-diethoxyphenyl)-2-n-dipropylaminomethyl-5,6-dimethoxybenzimidazole*

34.6 g. of 1-(3',4'-diethoxybenzyl)-2-chloromethyl-5,6-diethoxybenzimidazole (produced for example according to Example 1, 2 or 3) are dissolved in 180 cc. of toluene, and under stirring and cooling with ice water and with the exclusion of moisture gradually mixed with a solution of 20.3 g. of n-dipropylamine in 40 cc. of toluene. The reaction mixture is allowed to stand overnight at room temperature and is subsequently heated on a steam bath for an additional 2 hours. After cooling, the precipitated dipropylamine-hydrochloride (8.8 g.) is filtered off under suction. The filtrate is concentrated under vacuum. The residue is dissolved in ether, the ether solution is washed several times with water and then extracted with dilute hydrochloric acid. The acid extract is washed with ether, treated with decolorizing charcoal and made alkaline with sodium carbonate solution. The base is extracted with ether and the ethereal solution is washed with water and saturated with sodium chloride solution. After drying over potassium carbonate, the ether is evaporated off. There remains 1-(3',4'-diethoxybenzyl) - 2-n-dipropylaminomethyl-5,6-diethoxybenzimidazole in a yield of 72% of the theoretical.

The base can be recrystallized from pentane. After drying under vacuum at 40° C., the melting point is 69.5–71° C. To produce the monohydrochloride, 166.3 g. of the base are dissolved in 334.3 cc. of 1 n hydrochloric acid. After purification with carbon, the solution is evaporated under vacuum. The residue is dried in a desiccator over potassium hydroxide and then recrystallized from ether. The yield is 159.0 g. The compound melts at 99–104° C. (containing 1 $H_2O$). The dihydrochloride melts at 164–166° C.

Example 6.—1-(3',4'-diethoxybenzyl)-2-diisopropyl-aminomethyl-5,6-diethoxybenzimidazole 25.9 g. of 1-(3',4'-diethoxybenzyl)-2-chloromethyl-5,6-diethoxybenzimidazole (produced for example according to Example 1, 2 or 3) are introduced into 100 cc. of diisopropylamine under stirring and cooling with ice water. The introduction is carried out slowly. The reaction mixture is allowed to stand several hours at room temperature under exclusion of moisture. It is then heated for 3 hours under refluxing, 150 cc. of toluene are added thereto and it is further boiled for an additional two hours. It is then distilled under normal pressure to one-half of the liquid volume, filtered after cooling, and the filtrate is concentrated to dryness. The further working up proceeds as in Example 5.

The 1-(3',4'-diethoxybenzyl)-2-diisopropylaminomethyl-5,6-diethoxybenzimidazole recrystallized from methanol melts after drying under vacuum at 40° C. at a temperature of 89–91° C.

The monohydrochloride after drying at 40° C. under vacuum has a melting point of 170–171° C.

Example 7.—1-(3'4'-diethoxybenzyl)-2-t-butylamino-methyl-5,6-diethoxybenzimidazole.

21.7 g. of 1-(3',4'-diethoxybenzyl)-2-chloromethyl-5,6-diethoxybenzimidazole (produced according to Example 1,2 or 3) are dissolved in 125 cc. of alcohol. 8.1 g. of t-butylamine in 125 cc. of alcohol are slowly added dropwise under stirring and exclusion of moisture to the solution. The reaction mixture is heated gradually and is boiled under refluxing for 4½ hours. It is then evaporated to dryness under vacuum. The residue is taken up in ether and water. The ethereal solution is washed with water until neutral and subsequently extracted with very dilute hydrochloric acid.

A resulting precipitated smeary precipitate is separated, extracted again with water and then discarded. The acidic aqueous extract is combined with the aqueous extract, washed with ether and treated with decolorizing charcoal. After it has been made alkaline with sodium carbonate solution, the base is taken up in ether. The ethereal solution is washed with water and dried over potassium carbonate.

After distilling off of the ether there remains the crude 1-(3',4'-diethoxybenzyl)-2-t-butylaminomethyl-5,6-diethoxybenzimidazole which is recrystallized from cyclohexane. After drying at 50° C. under vacuum, the base has a melting point of 107–108.5° C. The monohydrochloride is dried in air. It melts at 99–107° C. and contains 1 mol of water of crystallization.

Example 8.—1-(3',4'-diethoxybenzyl)-2-diethanolamino-methyl-5,6-diethoxybenzimidazole 14.4 g. of 1-(3',4'-diethoxybenzyl)-2-chloromethyl-5,6-diethoxybenzimidazole (produced according to Example 1, 2 or 3) are dissolved in 30 cc. of chloroform and gradually mixed with a solution of 8.4 g. of diethanolamine in 20 cc. of chloroform under stirring and cooling with ice water and exclusion of moisture. The reaction mixture is permitted to stand overnight at room temperature and then subsequently heated for 3 hours under refluxing.

After cooling, the reaction mixture is washed with water and the chloroform phase concentrated under vacuum at a maximum temperature of 40° C. The residue is then taken up in benzene under warming, cooled to room temperature and the benzene solution is washed one time with a small amount of water. The benzene phase is then extracted with dilute hydrochloric acid. The acid, aqueous extract is washed with ether, treated with decolorizing charcoal and made alkaline with sodium carbonate solution.

The 1-(3',4'-diethoxybenzyl)-2-diethanolaminomethyl-5,6-diethoxybenzimidazole is taken up in benzene and dried over potassium carbonate. The benzene is evaporated under vacuum. There remains the immediately crystallizable base. It melts at 85–89° C. after drying in a vacuum desiccator. The monohydrochloride is treated in aqueous solution with decolorizing charcoal and then evaporated under vacuum. After recrystallization from methanol-ether and drying under vacuum at 60° C., it melts at 171–172° C.

Example 9.—1-(3',4'-diethoxybenzyl)-2-piperidinomethyl-5,6-diethoxybenzimidazole 14.3 g. of 1-(3',4'-diethoxybenzyl)-2-chloromethyl-5,6-diethoxybenzimidazole (produced according to Example 1, 2 or 3) are reacted with 6.8 g. of piperidine in accordance with Example 1. The thus obtained 1-(3',4'-diethoxybenzyl)-2-piperidinomethyl-5,6-diethoxybenzimidazole is rubbed with petroleum ether, filtered off under suction and dried in a vacuum desiccator. It melts at 66–69° C. The yield amounts to 64% of the theoretical.

The base can be recrystallized from petroleum ether. It melts at a temperature of 68–70° C., after drying.

To produce the monohydrochloride, the base is dissolved in the calculated amount of dilute hydrochloric acid under warming and the hot solution is treated with carbon. The solution is then brought to dryness. After recrystallization from methanol-ether it is dried in a vacuum desiccator. The monohydrochloride contains 1 mol of water of crystallization and melts at 130–133° C.

If the base is reacted with hydrochloric acid in a mol ratio of 1:0.5 and this solution evaporated after decolorizing with carbon, the neutral sulfate is obtained. After further drying and pulverization, the same melts at 152–161° C. The substance contains 1 mol of water of crystallization.

Example 10.—1-(3',4'-dimethoxybenzyl)-5,6-dimethoxy-benzimidazole

The production of the starting material N-(3',4'-dimethoxybenzyl)-4,5-dimethoxy-o-phenylenediamine proceeds analogously to Example 1. The intermediate stage to the 4,5-dinitroveratrol precipitates after recrystallization from ethanol with a yield of 84.2% of the theoretical. The melting point amounts to 128–130° C. The hydrogenation to the 4,5-dimethoxy-o-phenylenediamine proceeds with a yield of 92.3% of the theoretical. The melting point of the hydrogenated product is 129–130° C. The corresponding Schiff's Base with veratraldehyde is obtained in a yield of 85.3%. It melts at 120–122° C. From this is obtained an 87% yield the N-(3',4'-dimethoxybenzyl)-4,5-dimethoxy-o-phenylenediamine melting at 129–130° C.

10 g. of N-(3',4'-dimethoxybenzyl)-4,5-dimethoxy-o-phenylenediamine are heated to boiling in 100 cc. of 100% formic acid for 3 hours. The formic acid is then distilled off under vacuum. The residue is taken up in water, treated with decolorizing charcoal, and the filtrate is made alkaline with sodium hydroxide.

The reaction mixture is extracted several times with methylene chloride. After drying over sodium sulfate, the methylene chloride is evaporated and there is thus obtained 1-(3',4'-dimethoxybenzyl)-5,6-dimethoxybenzimidazole in a yield of 71.7% of the theoretical. The compound melts at 141–142° C.

The hydrochloride precipitates from the acetone solution of the base by means of ethereal hydrochloric acid. It melts at 187–188° C. (with decomposition).

Example 11.—1-p-ethoxybenzyl-5,6-diethoxy-benzimidazole

The production of the starting material N-p-ethoxybenzyl-4,5-diethoxy-o-phenylenediamine proceeds analogously to Example 1. 4,5-diethoxy-o-phenylenediamine gives the Schiff's base with p-ethoxybenzaldehyde in a yield of 90% of the theoretical. The Schiff's base melts at 117–120° C. If the melting point of the Schiff's base is too low, the base can be purified by hot extraction with isooctane, to melt at 117–119° C. The hydrogenation to the N-p-ethoxybenzyl-4,5 - diethoxy-o-phenylenediamine proceeds to a yield of 98% of the theoretical. The hydrogenated compound melts at 98–102° C. The dihydrochloride melts at 188–193° C.

15 g. of N-p-ethoxybenzyl-4,5-diethoxy-o-phenylenediamine are reacted with formic acid analogously to Example 10. The yield of 1-p-ethoxybenzyl-5,6-diethoxybenzimidazole amounts to 76% of the theoretical. It melts at 117–119° C. The base can be recrystallized from cyclohexane. It melts at 118–120° C. after drying under vacuum at 40° C.

The monohydrochloride is recrystallized from methanol-ether. It melts after drying in air at 115–119° C. and contains 1 mol of water of crystallization.

Example 12.—1-(3′,4′-diethoxybenzyl(-2-n-dibutylaminomethyl-5,6-diethoxybenzimidazole 20.65 g. of 1-(3′,4′-diethoxybenzyl)-2 - chloromethyl-5,6-diethoxybenzimidazole (produced according to Example 1) is reacted with 13.6 g. of dibutylamine analogously to Example 1. As found by the precipitate of dibutylaminohydrochloride, the reaction product amounts to 77.5% of the theoretical. The benzene solution which is washed with water until neutral is for further working up dried under vacuum. There is thus obtained a dark brown oil which extracted with pentane. The pentane solution is filtered over 100 g. of basic aluminum oxide (Woelm, activity stage I) and subsequently eluated with pentane. The coloring remains in the aluminum oxide. After evaporation of the pentane eluate there is obtained the 1- (3′,4′-diethoxybenzyl)-2-n-dibutylaminomethyl-5,6-diethoxybenzimidazole as a crystallized product melting at 55–57° C.

By proceeding analogously to the above examples, additional new compounds can be produced:

(A) STARTING MATERIALS

| | $R_4$ | A | B | B.P. or M.P. |
|---|---|---|---|---|
| (1) $R_4O$—⟨⟩—A, $R_4O$—⟨⟩—B | CH(CH$_3$)$_2$ | H | H | B.P., 11; 109–112° C. |
| | CH(CH$_3$)$_2$ | NO$_2$ | NO$_2$ | M.P., 140–141° C. |
| | CH(CH$_3$)$_2$ | NH$_2$ | NH$_2$ | M.P., 73.5–75° C. |

| | $R_4$ | $R_1$ | $R_2$ | M.P. |
|---|---|---|---|---|
| (2) | CH$_3$ | H | Cl | 120–122° C. |
| | C$_2$H$_5$ | H | H | 121–122° C. |
| | C$_2$H$_5$ | H | Cl | 113–115° C. |
| | C$_2$H$_5$ | H | O—CH(CH$_3$)$_2$ | 119–120° C. |
| | C$_2$H$_5$ | H | O(CH$_2$)$_5$CH$_3$ | 101–102° C. |
| | CH(CH$_3$)$_2$ | OC$_2$H$_5$ | OC$_2$H$_5$ | 126.5–128° C. |

| | $R_4$ | $R_1$ | $R_2$ | M.P. |
|---|---|---|---|---|
| (3) | CH$_3$ | H | Cl | 93–94.5° C. |
| | C$_2$H$_5$ | H | H | 60–62° C. |
| | C$_2$H$_5$ | H | Cl | 63–65° C. |
| | | | | *194–196° C. |
| | C$_2$H$_5$ | H | O—CH(CH$_3$)$_2$ | 60–63° C. |
| | C$_2$H$_5$ | H | O(CH$_2$)$_5$CH$_3$ | 61–63° C. |
| | CH(CH$_3$)$_2$ | OC$_2$H$_5$ | OC$_2$H$_5$ | 91–92.5° C. |

* Dihydrochloride.

(B) ADDITIONAL NEW BENZIMIDAZOLES

| $R_1$ | $R_2$ | $R_3$ | $R_4$ | M.P., base | M.P., monohydrochloride |
|---|---|---|---|---|---|
| H | H | H | $C_2H_5$ | 130–131.5° C | 199–201° C. |
| H | H | $CH_2-Cl$ | $C_2H_5$ | Further worked up as crude product. | |
| H | H | $CH_2-N(C_2H_5)_2$ | $C_2H_5$ | | 146–147° C. |
| H | Cl | $CH_2Cl$ | $CH_3$ | 190°–193° C. (with dec.). | |
| H | Cl | $CH_2-N(CH_3)_2$ | $CH_3$ | | 225–225.5° C. |
| H | Cl | $CH_2-N(C_2H_5)_2$ | $CH_3$ | | 196° C. |
| H | Cl | H | $C_2H_5$ | | 105–112° C. (with ½ mol water of crystallization). |
| H | Cl | $CH_2Cl$ | $C_2H_5$ | 127–132°C | |
| H | Cl | $CH_2-N(CH_3)_2$ | $C_2H_5$ | 79–80.5° C | 210–212° C. |
| H | Cl | $CH_2-N(C_2H_5)_2$ | $C_2H_5$ | 62–67° C | 152–154° C. |
| H | Cl | $CH_2-N\langle\text{pyrrolidine}\rangle$ | $C_2H_5$ | | 194–195° C. |
| H | $OC_2H_5$ | $CH_2-Cl$ | $C_2H_5$ | 115°–117° C | |
| H | $OC_2H_5$ | $CH_2-N(C_2H_5)_2$ | $C_2H_5$ | | ½ $H_2O$: 56–90° C. |
| H | $OCH(CH_3)_2$ | $CH_2-Cl$ | $C_2H_5$ | 111.5–114° C | |
| H | $O.CH(CH_3)_2$ | $CH_2-N(C_2H_5)_2$ | $C_2H_5$ | Oil | ½ $H_2O$: 62–64° C. |
| H | $OC_6H_{13}(n)$ | $CH_2Cl$ | $C_2H_5$ | 97.5–99° C | |
| H | $OC_6H_{13}(n)$ | $CH_2-N(C_2H_5)_2$ | $C_2H_5$ | | ½ $H_2O$: 53–54.5° C. |
| $OCH_3$ | $OCH_3$ | $CH_2Cl$ | $CH_3$ | Further worked up as crude product. | |
| $OCH_3$ | $OCH_3$ | $CH_2-N(CH_3)_2$ | $CH_3$ | | 209.5–210° C. |
| $OC_2H_5$ | $OC_2H_5$ | H | $C_2H_5$ | 145–146° C | |
| $OCH_3$ | $OCH_3$ | $CH_2-N(C_2H_5)_2$ | $CH_3$ | | 111.5–113.5° C (precipitates as 6.1% $H_2O$). |
| $OC_2H_5$ | $OC_2H_5$ | $CH_3$ | $C_2H_5$ | 121–123° C | 215–217° C. |
| $OC_2H_5$ | $OC_2H_5$ | $C_2H_5$ | $C_2H_5$ | 121–123° C | 184–185.5° C. |
| $OC_2H_5$ | $OC_2H_5$ | $CH_2-N\langle\text{morpholine}\rangle O$ | $C_2H_5$ | 125–126° C | 123–125° C. (with ½ mol water of crystallization). |

(B) ADDITIONAL NEW BENZIMIDAZOLES—Continued

| $R_1$ | $R_2$ | $R_3$ | $R_4$ | M.P., base | M.P., monohydrochloride |
|---|---|---|---|---|---|
| $OC_2H_5$ | $OC_2H_5$ | $CH_2$–N(piperazine)–$CH_3$ | $C_2H_5$ | 106–108° C | 133–134° C (dihydrate). |
| $OC_2H_5$ | $OC_2H_5$ | $CH_2$–N(piperazine)–$CH_2$–$CH_2$–OH | $C_2H_5$ | 81–85° C. (with ½ mol water of crystallization). | 184–186° C. |
| $OC_2H_5$ | $OC_2H_5$ | $CH_2$–Cl | $CH(CH_3)_2$ | 74–76.5° C | |
| $OC_2H_5$ | $OC_2H_5$ | $CH_2$–N($C_2H_5$)$_2$ | $CH(CH_3)_2$ | Oil | till now obtained only in amorphous form. |
| $OCH_3$ | $OCH_3$ | H | $CH_3$ | 141–142° C | |
| $OC_2H_5$ | $OC_2H_5$ | $CH_2$–N($C_2H_5$)$_2$ | $CH_2$–$CH_2$–$CH_3$ | | 199–202° C. |
| $OC_2H_5$ | $OC_2H_5$ | $CH_2$–N($C_2H_5$)$_2$ | $CH(CH_3)_2$ | | |
| $OC_2H_5$ | $OC_2H_5$ | $CH_2$–N($C_2H_5$)$_2$ | $(CH_2)_3CH_3$ | | 125–126° C. |
| $OC_2H_5$ | $OC_2H_5$ | $CH_2$–N($C_2H_5$)$_2$ | $CH_2$–$CH(CH_3)_2$ | 204–206° C | |
| $OC_2H_5$ | $OC_2H_5$ | $CH_2$–N($CH_3$)($CH(CH_3)_2$) | $C_2H_5$ | | 121° C. |
| $OC_2H_5$ | $OC_2H_5$ | $CH_2$–N($C_2H_5$)($CH_2$–$CH_2$–$CH_3$) | $C_2H_5$ | | 96–99° C. monohydrate. |
| $OC_2H_5$ | $OC_2H_5$ | $CH_2$–N($C_2H_5$)($CH(CH_3)_2$) | $C_2H_5$ | | 144–147° C. |
| $OC_2H_5$ | $OC_2H_5$ | $CH_2$–N($CH_3$)($CH_2$–$CH(CH_3)_2$) | $C_2H_5$ | 64–69° C | |
| $OC_2H_5$ | $OC_2H_5$ | $CH_2$–N($CH_3$)($CH(CH_3)$–$CH_2$–$CH_3$) | $C_2H_5$ | 81–83° C | |
| $OC_2H_5$ | $OC_2H_5$ | $CH_2$–N($CH_3$)(($CH_2$)$_3$–$CH_3$) | $C_2H_5$ | 89–91° C | |
| $OC_2H_5$ | $OC_2H_5$ | $CH_2$–N(pyrrolidine) | $C_2H_5$ | 87–88° C | |
| $OC_2H_5$ | $OC_2H_5$ | $CH_2$–N(2,6-dimethylpiperazine)–NH | $C_2H_5$ | | 221–223° C. |
| $OC_2H_5$ | $OC_2H_5$ | $CH_2$–N($CH_2$–$CH_2$–OH)($C_2H_5$) | $C_2H_5$ | 97–99° C | |

(B) ADDITIONAL NEW BENZIMIDAZOLES—Continued

| R₁ | R₂ | R₃ | R₄ | M.P., base | M.P., monohydrochloride |
|---|---|---|---|---|---|
| OC₂H₅ | OC₂H₅ | CH₂—N(CH₂—CHOH—CH₃)₂ | C₂H₅ | | 175–177° C. |
| OC₂H₅ | OC₂H₅ | CH₂—N(CH₂—CH₂OH)(CH₂—CHOH—CH₂—CH₃) | C₂H₅ | | 124–128° C. |
| OC₂H₅ | OC₂H₅ | CH₂—NH—(pyrimidinyl-OCH₃) | C₂H₅ | 131–133° C. | |
| OC₂H₅ | OC₂H₅ | CH₂—N(CH₃)—(pyrimidinyl-OC₂H₅-OCH₃) | C₂H₅ | 117–119° C. | |
| OC₂H₅ | OC₂H₅ | CH₂—NH(CH₂—CH=CH₂) | C₂H₅ | | 179° C. |
| OC₂H₅ | OC₂H₅ | CH₂—NH—CH(CH₂—CH₂)(CH₂—CH₂)CH₂ | C₂H₅ | 86–88° C. | |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of compounds of the formula

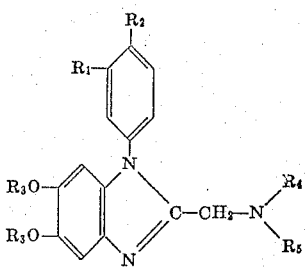

wherein $R_1$ is selected from the group consisting of hydrogen and lower alkoxy, wherein $R_2$ is selected from the group consisting of hydrogen, halogen and lower alkoxy, wherein $R_3$ is lower alkyl, wherein $R_4$ is selected from the group consisting of lower alkyl, lower hydroxyalkyl and cyclohexyl, wherein $R_5$ is selected from the group consisting of lower alkyl, lower hydroxyalkyl and hydrogen and wherein $R_4$ and $R_5$ together with the nitrogen atom are selected from the group consisting of morpholine, piperidine, pyrrolidine and piperazine, which later may be substituted by lower alkyl or lower hydroxyalkyl; and non-toxic acid addition salts thereof.

2. 1-(3′,4′-diethoxybenzyl)-2-diethylaminomethyl - 5,6-diethoxybenzimidazole-hydrochloride.
3. 1-(3′,4′-diethoxybenzyl)-2-diethylaminomethyl - 5,6-diethoxybenzimidazole-nitrate.
4. 1-(3′,4′-diethoxybenzyl)-2-morpholinomethyl - 5,6-diethoxybenzimidazole-hydrochloride.
5. 1-(3′,4′-diethoxybenzyl)-2-diethanolaminomethyl - 5,6-diethoxybenzimidazole-hydrochloride.
6. 1-(3′4′-diethoxybenzyl)-2-piperidinomethyl-5,6 - diethoxybenzimidazole-hydrochloride.
7. 1-(3′,4′-diethoxybenzyl)-2-dimethylaminomethyl - 5,6-diethoxybenzimidazole-hydrochloride.
8. 1-(3′,4′-diethoxybenzyl)-2-dipropylaminomethyl - 5,6-diethoxybenzimidazole-hydrochloride.
9. 1-p-chlorobenzyl-2-dimethylaminomethyl-5,6 - diethoxybenzimidazole-hydrochloride.
10. 1-p-chlorobenzyl-2-dimethylaminomethyl-5,6 - dimethoxybenzimidazole-hydrochloride.
11. 1-p-ethoxybenzyl-2-diethylaminomethyl-5,6 - diethoxybenzimidazole-hydrochloride.
12. 1-benzyl-2-diethylaminomethyl-5,6 - diethoxybenzimidazole-hydrochloride.
13. 1-p-chlorobenzyl-2-diethylaminomethyl - 5,6 - diethoxybenzimidazole-hydrochloride.
14. 1-(3′,4′-dimethoxybenzyl)-2-diethylaminomethyl-5,6-dimethoxybenzimidazole-hydrochloride.
15. 1-(3′,4′-diethoxybenzyl)-2-diisopropylaminomethyl-5,6-diethoxybenzimidazole-hydrochloride.
16. 1-(3′,4′-diethoxybenzyl)-2 - ethyl - propylaminomethyl-5,6-diethoxybenzimidazole-hydrochloride.
17. 1-(3′,4′-diethoxybenzyl)-2-ethyl - isopropylaminomethyl-5,6-diethoxybenzimidazole-hydrochloride.
18. 1-(3′,4′-diethoxybenzyl)-2-methyl-sec - butylaminomethyl-5,6-diethoxybenzimidazole-hydrochloride.
19. 1-(3′,4′-diethoxybenzyl)-2-pyrrolidylmethyl-5,6 - diethoxybenzimidazole-hydrochloride.
20. 1-(3′,4′-diethoxybenzyl)-2-methylpiperazinomethyl-5,6-diethoxybenzimidazole-hydrochloride.
21. 1-(3′,4′-diethoxybenzyl) - 2 - oxyethylpiperazinomethyl-5,6-diethoxybenzimidazole-hydrochloride.
22. 1-(3′,4′-diethoxybenzyl)-2 - ethyl - hydroxyethylaminomethyl-5,6-diethoxybenzimidazole-hydrochloride.
23. 1-(3′,4′-diethoxybenzyl)-2-allylaminomethyl - 5,6-diethoxybenzimidazole-hydrochloride.
24. 1-(3′4,′-diethoxybenzyl)-2-cyclohexylaminomethyl-5,6-diethoxybenzimidazole-hydrochloride.
25. 1-(4′-cyclohexyloxybenzyl)-2-diethylaminomethyl-5,6-diethoxybenzimidazole-hydrochloride.
26. 1-(3′,4′-diethoxybenzyl)-2-diethylaminomethyl - 5,6-dipropoxybenzimidazole-hydrochloride.
27. 1-(3′4′-diethoxybenzyl)-2-diethylaminomethyl - 5,6-diisobutoxybenzimidazole-hydrochloride.

References Cited by the Examiner

UNITED STATES PATENTS 1,915,334  6/1933  Salzberg et al. _____ 260—243
2,075,359  3/1937  Salzberg et al. _____ 167—22

OTHER REFERENCES

Elderfield: Heterocyclic Compounds, vol. 5, Wiley, 1957, p. 287.

Fieser and Fieser: Advanced Organic Chemistry, Reinhold, 1961, pp. 326, 495.

ALEX MAZEL, *Primary Examiner.*

NICHOLAS S. RIZZO, HENRY R. JILES, *Examiners.*

JOSE TOVAR, RICHARD J. GALLAGHER,
*Assistant Examiners.*